US012659759B2

(12) United States Patent
Saab et al.

(10) Patent No.: US 12,659,759 B2
(45) Date of Patent: Jun. 16, 2026

(54) ADAPTIVE BEAMFORMING BASED ON JPTA FREQUENCY SELECTIVE SYSTEMS FOR SMART REPEATERS

(71) Applicant: Samsung Electronics Co., Ltd., Suwon-si (KR)

(72) Inventors: Sandy Saab, Plano, TX (US); Shadi Abu-Surra, Plano, TX (US); Gang Xu, Allen, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 18/479,742

(22) Filed: Oct. 2, 2023

(65) Prior Publication Data

US 2024/0121625 A1 Apr. 11, 2024

Related U.S. Application Data

(60) Provisional application No. 63/414,307, filed on Oct. 7, 2022.

(51) Int. Cl.
H04W 16/28 (2009.01)
H01Q 3/22 (2006.01)
(Continued)

(52) U.S. Cl.
CPC .............. H04W 16/28 (2013.01); H01Q 3/22 (2013.01); H04L 5/0023 (2013.01); H04W 16/26 (2013.01)

(58) Field of Classification Search
CPC ........ H04W 16/28; H04W 16/26; H01Q 3/22; H04L 5/0023
See application file for complete search history.

(56) References Cited

U.S. PATENT DOCUMENTS 11,223,411 B2 1/2022 Abedini et al.
11,804,877 B2 * 10/2023 Wang .................. H04B 7/0695
(Continued)

FOREIGN PATENT DOCUMENTS

EP 3855641 A1 7/2021

OTHER PUBLICATIONS

Qua Nguyen, D. and Kim, T., "Joint Delay and Phase Precoding Under True-Time Delay Constraints for THz Massive MIMO", <i>arXiv e-prints</i>, Art. No. arXiv:2111.10365, 2021. doi:10.48550/ arXiv.2111.10365. (Year: 2021).*
(Continued)

*Primary Examiner* — Ivan O Latorre

(57) ABSTRACT

A smart repeater includes a transceiver configured to receive a reference signal, receive, from a base station (BS), a subcarrier allocation for a plurality of user equipments (UEs), receive, from the BS, a downlink (DL) beam associated with the plurality of UEs, and retransmit the DL beam. The smart repeater further includes a processor, operatively coupled to the transceiver, the processor configured to determine a beam split configuration for the DL beam based on the subcarrier allocation, and cause the transceiver to retransmit the DL beam according to the beam split configuration. To retransmit the DL beam according to the beam split configuration the transceiver is further configured to generate a frequency dependent beam for each of the plurality of UEs, and direct the frequency dependent beam for each of the plurality of UEs to a UE associated with the frequency dependent beam.

20 Claims, 11 Drawing Sheets

(51) Int. Cl.
  H04L 5/00      (2006.01)
  H04W 16/26    (2009.01)

(56) References Cited

U.S. PATENT DOCUMENTS

| 2008/0025251 | A1* | 1/2008 | Lee | H04L 5/0037 |
| | | | | 370/328 |
| 2009/0161612 | A1* | 6/2009 | Liu | H04L 5/0037 |
| | | | | 370/329 |
| 2017/0331544 | A1* | 11/2017 | Athley | H04B 7/06956 |
| 2019/0020402 | A1* | 1/2019 | Gharavi | H04B 7/15514 |
| 2019/0181943 | A1* | 6/2019 | Liang | H04B 7/2606 |
| 2021/0036764 | A1 | 2/2021 | Li et al. | |
| 2021/0037486 | A1 | 2/2021 | Li et al. | |
| 2021/0297870 | A1* | 9/2021 | Luo | H04B 7/145 |
| 2022/0014935 | A1* | 1/2022 | Haija | H04L 5/0048 |
| 2022/0029679 | A1* | 1/2022 | Pezeshki | H04B 7/0628 |
| 2022/0103247 | A1 | 3/2022 | Abedini et al. | |
| 2022/0116097 | A1* | 4/2022 | Marinier | H04B 7/0456 |
| 2022/0174509 | A1 | 6/2022 | Noh et al. | |
| 2022/0278715 | A1* | 9/2022 | Tsui | H04L 25/0222 |
| 2022/0368436 | A1* | 11/2022 | Abedini | H04B 17/27 |
| 2022/0377587 | A1 | 11/2022 | Abedini et al. | |
| 2022/0393757 | A1* | 12/2022 | Gharavi | H04B 7/0617 |
| 2023/0016721 | A1 | 1/2023 | Abedini et al. | |
| 2023/0050960 | A1 | 2/2023 | Abedini et al. | |
| 2023/0136372 | A1 | 5/2023 | Ratnam et al. | |
| 2023/0208486 | A1* | 6/2023 | Dai | H04B 7/04013 |
| | | | | 370/315 |
| 2023/0258759 | A1* | 8/2023 | Wang | G01S 1/0423 |
| | | | | 455/456.1 |
| 2023/0361823 | A1* | 11/2023 | Mo | H04B 7/0617 |
| 2023/0362671 | A1* | 11/2023 | Mo | H04B 7/0408 |
| 2024/0014881 | A1* | 1/2024 | Zhu | H04L 5/0051 |
| 2024/0106499 | A1* | 3/2024 | Sahraei | H04L 27/26025 |
| 2024/0121625 | A1* | 4/2024 | Saab | H04W 16/28 |
| 2024/0133994 | A1* | 4/2024 | Duan | H04B 7/04013 |
| 2024/0171447 | A1* | 5/2024 | Hemadeh | H04L 27/36 |
| 2024/0243803 | A1* | 7/2024 | Echigo | H04B 7/1555 |
| 2024/0259052 | A1* | 8/2024 | Wang | H04L 27/2602 |
| 2024/0305335 | A1* | 9/2024 | Elshafie | H01Q 15/0013 |
| 2024/0356625 | A1* | 10/2024 | Walker | H04B 7/15528 |
| 2024/0372598 | A1* | 11/2024 | AlAmmouri | H04B 7/0695 |
| 2025/0056560 | A1* | 2/2025 | Zhu | H04L 5/001 |
| 2025/0070847 | A1* | 2/2025 | Yildiz | H04B 7/0617 |
| 2025/0096852 | A1* | 3/2025 | Tong | H04B 7/06952 |
| 2025/0158664 | A1* | 5/2025 | Makki | H04B 7/0695 |
| 2025/0247715 | A1* | 7/2025 | You | H04B 7/155 |

OTHER PUBLICATIONS

Tataria et al., "6G Wireless Systems: Vision, Requirements, Challenges, Insights, and Opportunities," Proceedings of the IEEE, vol. 109, No. 7, Jul. 2021, pp. 1166-1199, doi: 10.1109/JPROC.2021.3061701, 34 pages.

Naqvi et al., "Achieving 5G NR mmWave Indoor Coverage Under Integrated Access Backhaul," IEEE Systems Journal, vol. 15, No. 4, Dec. 2021, pp. 5429-5439, doi: 10.1109/JSYST.2021.3053550, 11 pages.

Flamini et al., "Towards a Heterogeneous Smart Electromagnetic Environment for Millimeter-Wave Communications: An Industrial Viewpoint," in IEEE Transactions on Antennas and Propagation, doi: 10.1109/TAP.2022.3151978, 12 pages.

Alammouri et al., "Extending Uplink Coverage of mmWave and Terahertz Systems Through Joint Phase-Time Arrays," IEEE Access, vol. 10, pp. 88872-88884, 2022, doi: 10.1109/ACCESS.2022.3200334, 13 pages.

Ratnam et al., "Joint Phase-Time Arrays: A Paradigm for Frequency-Dependent Analog Beamforming in 6G," IEEE Access, vol. 10, pp. 73364-73377, 2022, doi: 10.1109/ACCESS.2022.3190418, 14 pages.

Hashemi et al., "Integrated true-time-delay-based ultra-wideband array processing," IEEE Communications Magazine, vol. 46, No. 9, Sep. 2008, pp. 162-172, 11 pages.

Rotman et al., "True time delay in phased arrays," Proceedings IEEE, vol. 104, No. 3, Mar. 2016, pp. 504-518, 15 pages.

Mendez-Rial et al., "Hybrid MIMO architectures for millimeter wave communications: Phase shifters or switches?," IEEE Access, vol. 4, 2016, pp. 247-267, 20 pages.

Boccardi et al., "Five disruptive technology directions for 5G," IEEE Communication Magazine, vol. 52, No. 2, Feb. 2014, pp. 74-80, 7 pages.

Rizzato, "Quantifying the mmWave 5G experience in the U.S.," OpenSignal, retrieved on Aug. 21, 2023, retrieved from URL<https://www.opensignal.com/2021/04/28/quantifying-the-mmwave-5g-experience-in-the-us>, Apr. 2021, 5 pages.

Jans et al., "Frequency-selective analog beam probing for millimeter wave communication systems," IEEE Wireless Communications and Networking Conference (WCNC), May 2020, pp. 1-6, 6 pages.

Rave et al., "On the mapping between steering direction and frequency of a uniform linear array with fixed true time delays," Proc. Int. ITG Workshop Smart Antennas (WSA), Feb. 2020, pp. 1-6, 6 pages.

International Search Report and Written Opinion issued Jan. 16, 2024 regarding International Application No. PCT/KR2023/015394, 6 pages.

Moderator (Qualcomm), "Email discussion for RAN4 R17 non-spectrum work areas: Smart Repeaters", 3GPP TSG-RAN Meeting #89e, RP-201830, Sep. 2020, 10 pages.

* cited by examiner

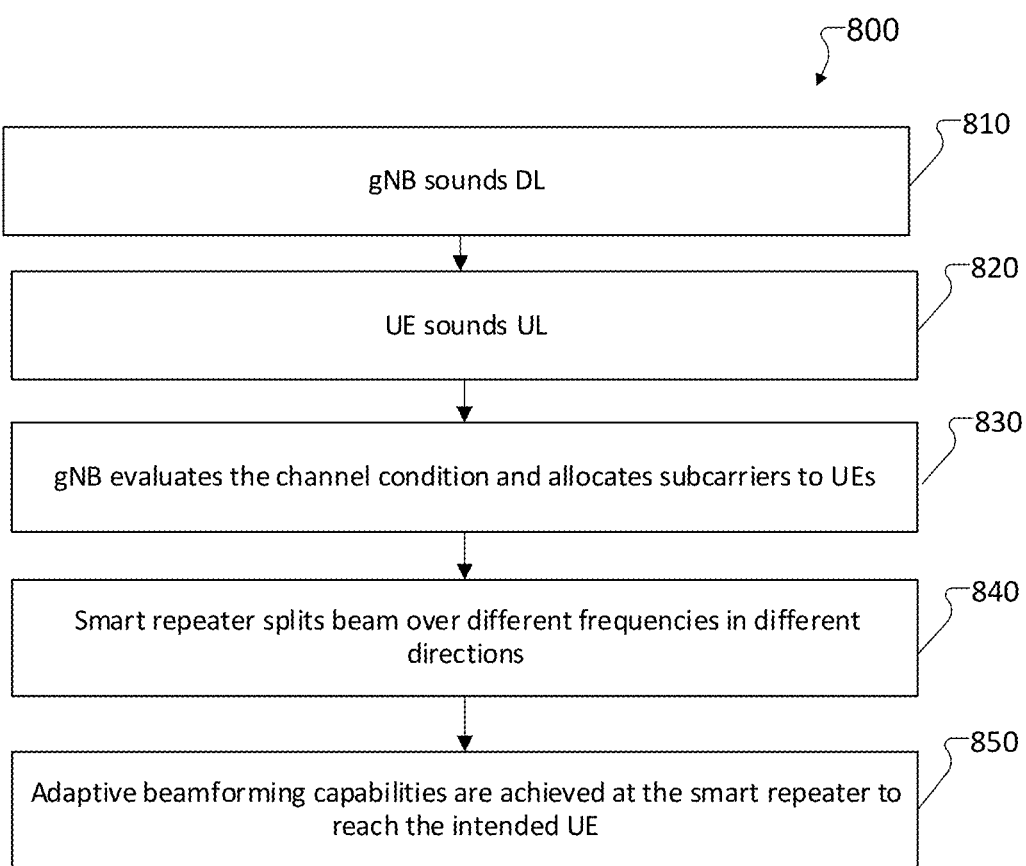

┌─800

┌─810
┌─────────────────────────────────────────────────────┐
│                    gNB sounds DL                      │
└─────────────────────────────────────────────────────┘

┌─820
┌─────────────────────────────────────────────────────┐
│                    UE sounds UL                       │
└─────────────────────────────────────────────────────┘

┌─830
┌─────────────────────────────────────────────────────┐
│  gNB evaluates the channel condition and allocates subcarriers to UEs  │
└─────────────────────────────────────────────────────┘

┌─840
┌─────────────────────────────────────────────────────┐
│  Smart repeater splits beam over different frequencies in different    │
│                          directions                   │
└─────────────────────────────────────────────────────┘

┌─850
┌─────────────────────────────────────────────────────┐
│  Adaptive beamforming capabilities are achieved at the smart repeater to  │
│                     reach the intended UE             │
└─────────────────────────────────────────────────────┘

FIG. 8

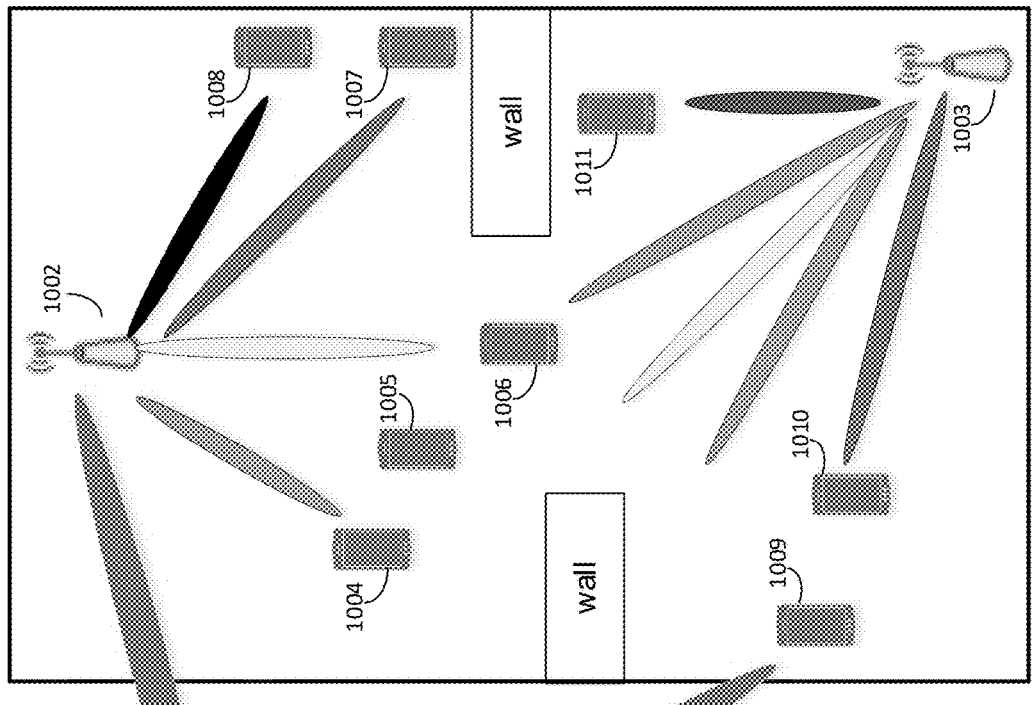
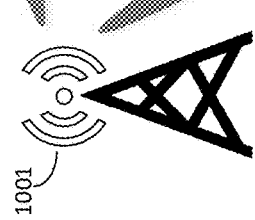
FIG. 10

ADAPTIVE BEAMFORMING BASED ON JPTA FREQUENCY SELECTIVE SYSTEMS FOR SMART REPEATERS

CROSS-REFERENCE TO RELATED APPLICATION(S) AND CLAIM OF PRIORITY

This application claims priority under 35 U.S.C. § 119(e) to U.S. Provisional Patent Application No. 63/414,307 filed on Oct. 7, 2022. The above-identified provisional patent application is hereby incorporated by reference in its entirety.

TECHNICAL FIELD

This disclosure relates generally to wireless networks. More specifically, this disclosure relates to adaptive beamforming based on joint phase-time array frequency selective systems for smart repeaters.

BACKGROUND

Millimeter-wave (mmWave) is a key technology in 5G cellular systems as it promises high data rates due to the sizeable available bandwidth. At mmWave and higher frequencies, however, the signal suffers from severe attenuation and path-loss. Blockage leads to system coverage limitations due to the signal's sensitivity to obstacles (from buildings, human beings, desks, walls, doors, etc.). To address the coverage limitation issue, high gain antennas with narrow beamforming capabilities have been studied, designed and deployed. These antenna arrays are equipped with a high transmit power capability. Such approach, however, is not a sustainable solution for non-line-of-sight (NLoS) conditions. Thus, cell densification and additional network nodes are promising to enhance the performance of overall systems. Additional network nodes include but are not limited to reconfigurable intelligent surfaces (RISs), smart repeaters, active holographic surfaces, integrated active and backhaul nodes etc. It is important to realize that it might not always be feasible or economically viable to install many nodes in an area due to high costs for new site acquisition or power supply or hardware limitations. This indeed motivates finding new approaches to use these nodes to improve the system performance.

SUMMARY

This disclosure provides methods and apparatuses for adaptive beamforming based on joint phase-time array (JPTA) frequency selective systems for smart repeaters.

In one embodiment, a smart repeater is provided. The smart repeater includes a transceiver configured to receive a reference signal, receive, from a base station (BS), a subcarrier allocation for a plurality of user equipments (UEs), receive, from the BS, a downlink (DL) beam associated with the plurality of UEs, and retransmit the DL beam. The smart repeater further includes a processor, operatively coupled to the transceiver, the processor configured to determine a beam split configuration for the DL beam based on the subcarrier allocation, and cause the transceiver to retransmit the DL beam according to the beam split configuration. To retransmit the DL beam according to the beam split configuration the transceiver is further configured to generate a frequency dependent beam for each of the plurality of UEs, and direct the frequency dependent beam for each of the plurality of UEs to a UE associated with the frequency dependent beam.

In another embodiment, a method for operating a smart repeater is provided. The method includes receiving a reference signal, receiving, from a BS, a subcarrier allocation for a plurality of user equipments UEs, receiving, from the BS, a DL beam associated with the plurality of UEs, retransmitting the DL beam, and determining a beam split configuration for the DL beam based on the subcarrier allocation. Retransmitting the DL beam according to the beam split configuration includes generating a frequency dependent beam for each of the plurality of UEs, and directing the frequency dependent beam for each of the plurality of UEs to a UE associated with the frequency dependent beam.

In yet another embodiment, a non-transitory computer readable medium is provided. The non-transitory computer readable medium embodies a computer program including program code that, when executed by a processor of a device, causes the device to receive a reference signal, receive, from a BS, a subcarrier allocation for a plurality of UEs, receive, from the BS, a DL beam associated with the plurality of UEs, retransmit the DL beam, determine a beam split configuration for the DL beam based on the subcarrier allocation, and retransmit the DL beam according to the beam split configuration. To retransmit the DL beam according to the beam split configuration the computer program further includes program code that, when executed by the processor of the device, causes the device to generate a frequency dependent beam for each of the plurality of UEs, and direct the frequency dependent beam for each of the plurality of UEs to a UE associated with the frequency dependent beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 8 illustrates a method for allocating subcarriers to UEs when TX and RX JPTA arrays of a smart repeater are not calibrated to each other according to embodiments of the present disclosure;

FIG. 10 illustrates an example of a multiple smart repeater deployment according to embodiments of the present disclosure.

DETAILED DESCRIPTION

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO, array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
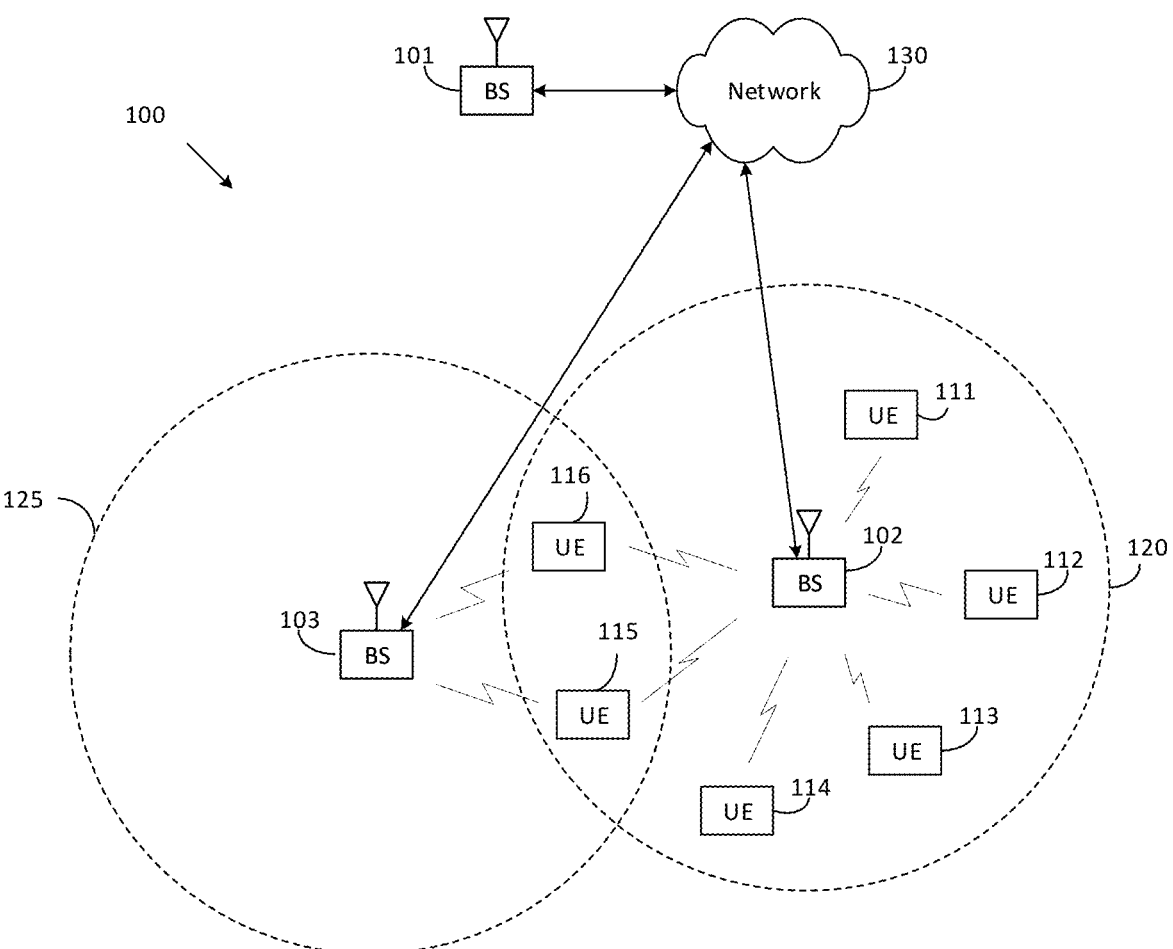
FIG. 1 illustrates an example wireless network according to embodiments of the present disclosure.
Figure 2:
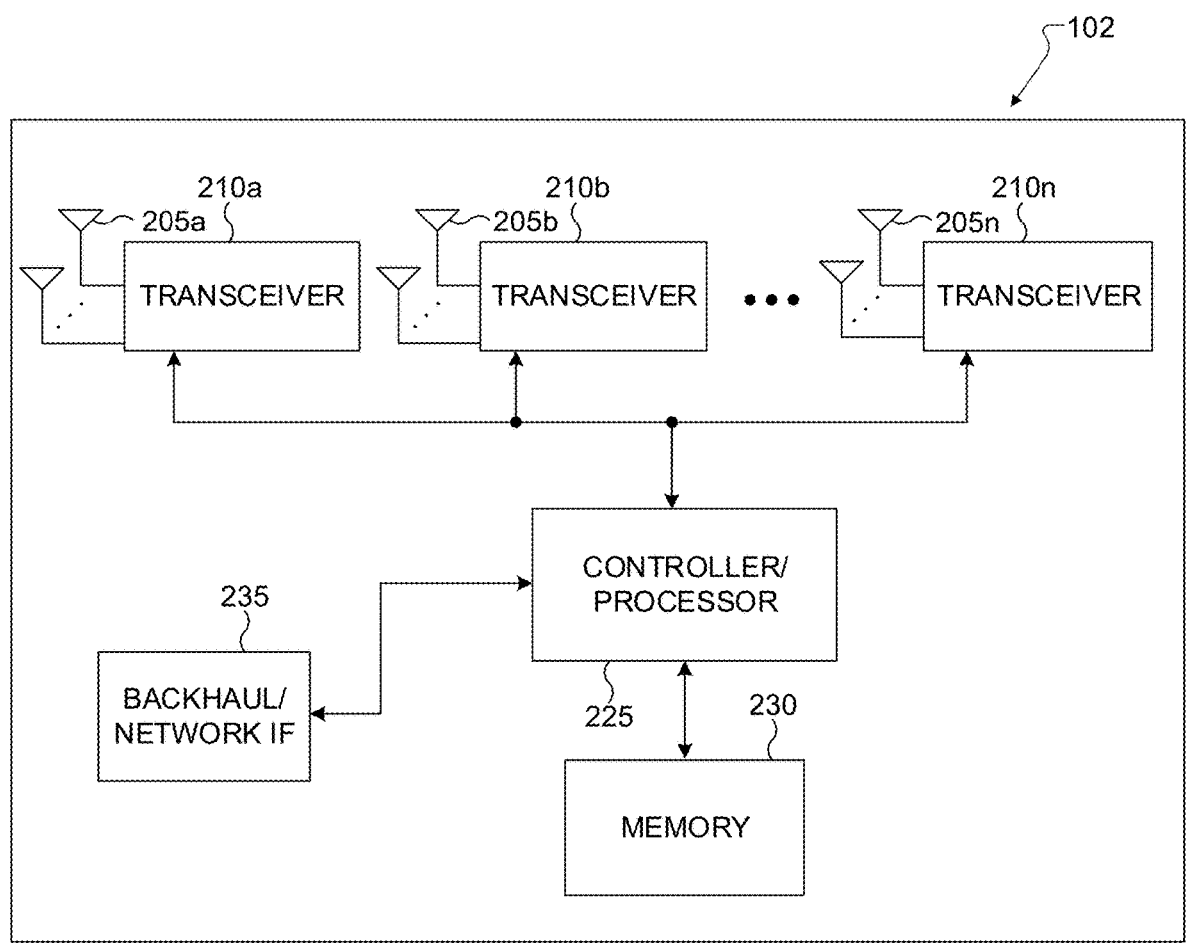
FIG. 2 illustrates an example gNB according to embodiments of the present disclosure.
Figure 3:
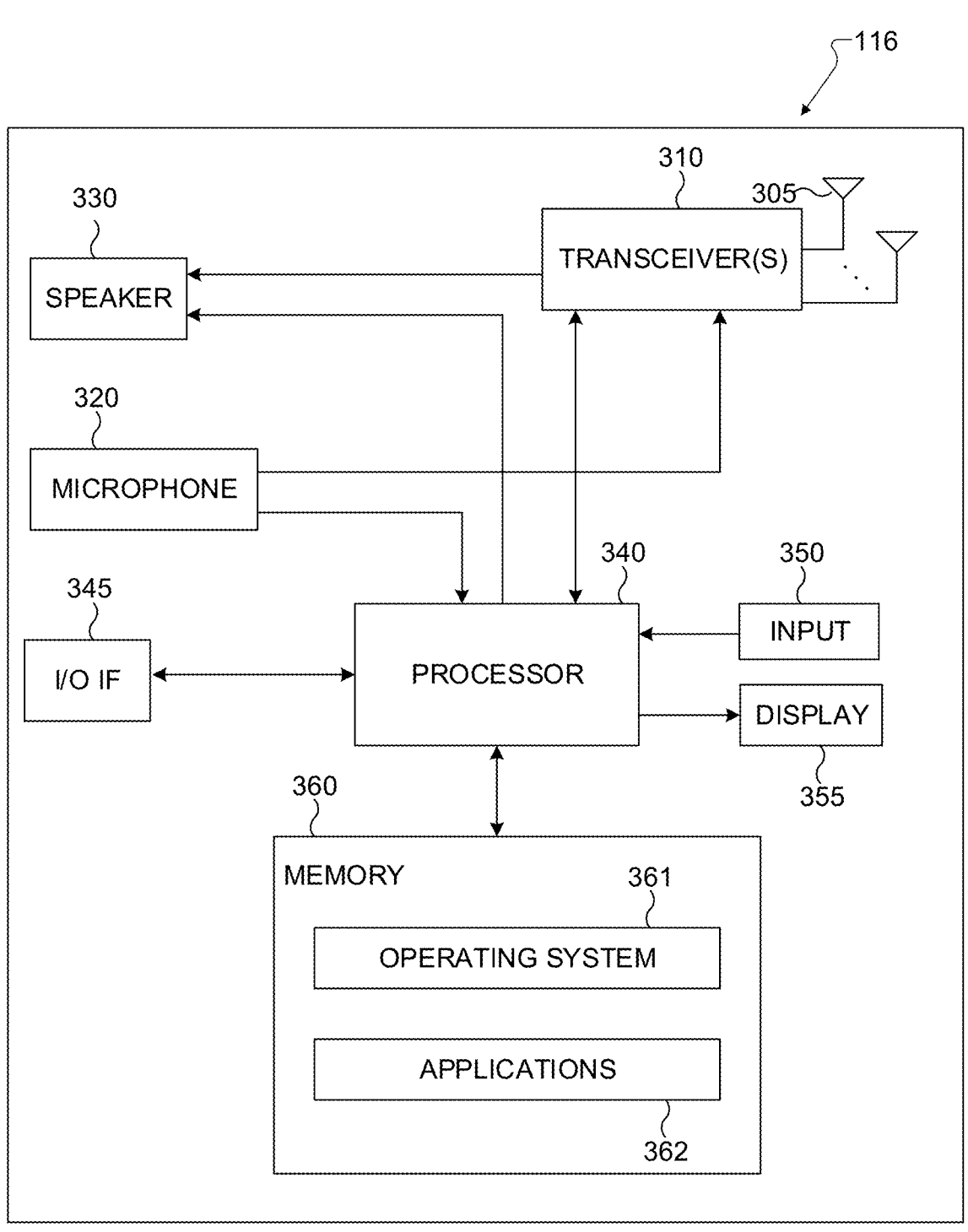
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for adaptive beamforming based on JPTA frequency selective systems for smart repeaters. In certain embodiments, one or more of the gNBs 101-103 includes circuitry, programing, or a combination thereof, to support adaptive beamforming based on JPTA frequency selective systems for smart repeaters in a wireless communication system.

Wireless network 100 may include one or more network entities (not shown). A network entity can represent one or more local computing resources, remote computing resources, clustered computing resources, components that act as a single pool of seamless computing resources, a cloud-based computing resource, a virtualized computing resource, and the like. A network entity can be accessed by one or more of the gNBs 101-103 and UEs 111-116 of FIG. 1 or another network entity. In some circumstances, a network entity may be integrated into another apparatus, and the apparatus may be referred to as a network entity. For example, a network entity may be integrated into gNB 102 making gNB a network entity. For instance, gNB 102 may include hardware that performs the functions of a network entity, may include virtual resources that perform the functions of a network entity, may include software that performs the functions of a network entity, and/or gNB 102 may perform the functions of network entity as an inherent feature of gNB 102.

In some circumstances, a network entity may be implemented across multiple apparatuses. For example, a network entity may be implemented across gNB 102 and gNB 103 such that gNB 102 and gNB 103 form a single network entity.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS and, for example, processes to support adaptive beamforming based on JPTA frequency selective systems for smart repeaters as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for adaptive beamforming based on JPTA frequency selective systems for smart repeaters as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A wireless network such as the wireless network of FIG. 1 may utilize millimeter-wave (mmWave) technology or other even higher frequency technology (e.g., in the THz range) to provide high data rates. At mmWave frequencies, however, the signal suffers from severe attenuation and path-loss. Blockage leads to system coverage limitations due to the signal's sensitivity to obstacles (from buildings, human beings, desks, walls, doors, etc.). To address the coverage limitation issue, smart repeaters may be utilized to improve coverage in areas with NLoS conditions to a gNB.

Smart repeaters are full-duplex nodes that can amplify and forward the signal to the intended receiver. They do not provide decoding and encoding capabilities but are easily deployed and are low in cost. Smart repeaters can amplify both the signal and the noise which leads to an increase in interference. When deployed as a network node, smart repeaters use control information from the gNB to enhance its beamforming capability.

In the present disclosure smart repeaters are used to assist in relaying a signal having poor or NLoS conditions (e.g., from an outdoor to an indoor setting) at mmWave frequencies. Instead of having many nodes in an indoor scenario, joint phase-time array (JPTA) technology may be used to assist the smart repeater in establishing adaptive beamforming. Such capabilities result in an improved indoor communication system where blockage and signal attenuation are a major issue. The collectivity of these technologies enables adaptive beamforming capabilities. JPTA generates frequency-dependent analog beams and is a type of hybrid beamforming. These frequency-dependent disparities are achieved using true-time delay elements that have a frequency-dependent phase response.

Figure 4:
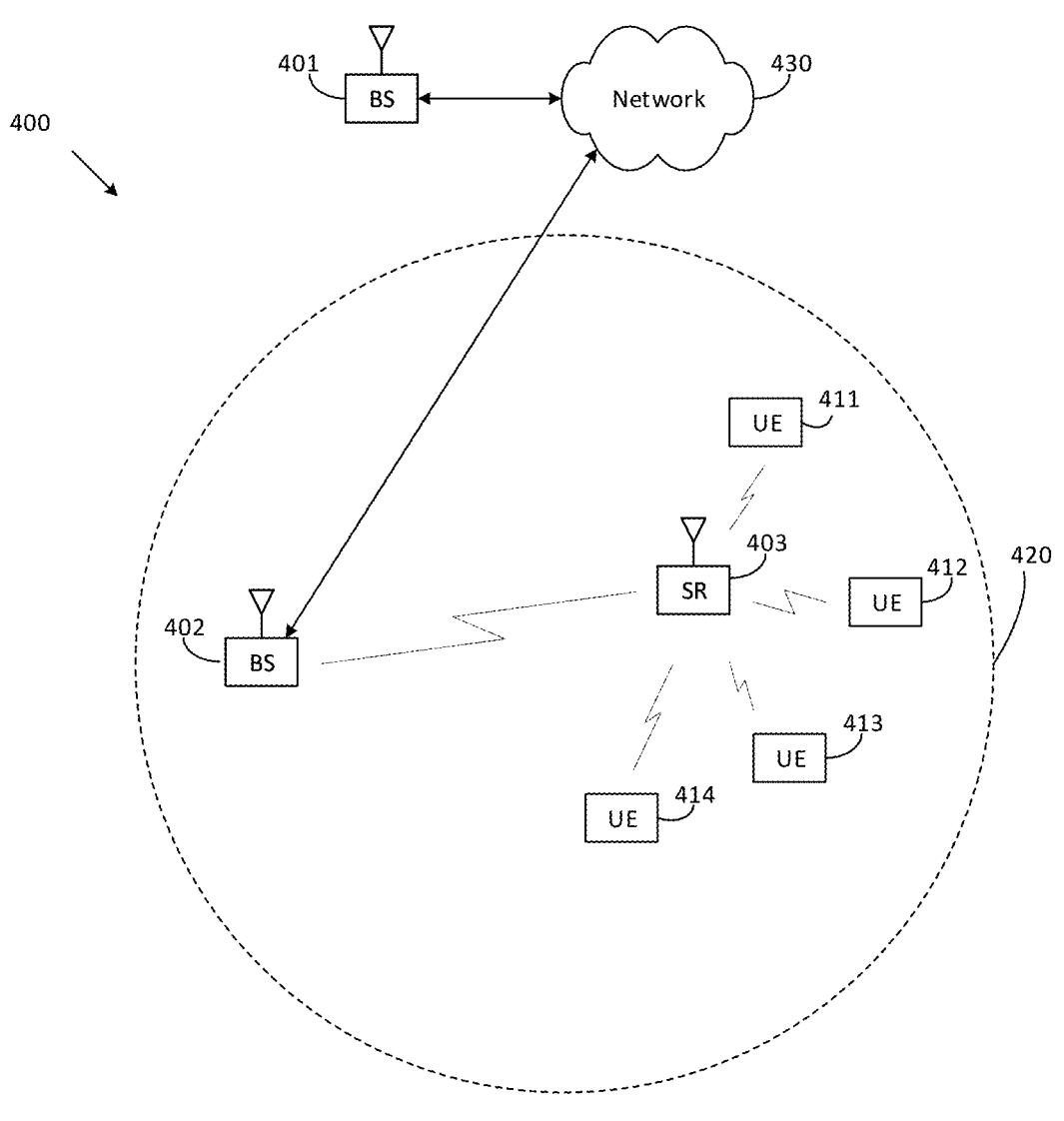
FIG. 4 illustrates an example wireless network including a smart repeater according to embodiments of the present disclosure.

FIG. 4 illustrates an example wireless network 400 including a smart repeater according to embodiments of the present disclosure. The embodiment of the wireless network 400 shown in FIG. 4 is for illustration only. Other embodiments of the wireless network 400 could be used without departing from the scope of this disclosure.

As shown in FIG. 4, the wireless network includes a gNB 401 (e.g., base station, BS), a gNB 402, and a smart repeater (SR) 403. The gNB 101 communicates with the gNB 102. The gNB 101 also communicates with at least one network 430, such as the Internet, a proprietary Internet Protocol (IP) network, or other data network.

The gNB 402 provides wireless broadband access to the network 430 for a plurality of user equipments (UEs) within a coverage area 420 of the gNB 402. The plurality of UEs includes a UE 411, 412, 413, and 414 which may be located in a small business with a poor line of site to gNB 402. To improve communication with UEs 411-414, smart repeater 402 may be located in the small business with UEs 411-414, and may relay signals between gNB 402 and UEs 411-414. In some embodiments, one or more of the gNBs 401-402 and smart repeater 403 may communicate with each other and with the UEs 411-414 using 5G/NR, long term evolution (LTE), long term evolution-advanced (LTE-A), WiMAX, WiFi, or other wireless communication techniques.

Dotted lines show the approximate extents of the coverage area 420 a which is shown as approximately circular for the purposes of illustration and explanation only. It should be clearly understood that the coverage areas associated with gNBs, such as the coverage area 420 may have other shapes, including irregular shapes, depending upon the configuration of the gNBs and variations in the radio environment associated with natural and man-made obstructions.

Similar as previously described regarding UEs 111-116 of FIG. 1, one or more of the UEs 411-114 include circuitry, programing, or a combination thereof, for adaptive beamforming based on JPTA frequency selective systems for smart repeaters. In certain embodiments, one or more of the gNBs 401-402 and smart repeater 402 includes circuitry, programing, or a combination thereof, to support adaptive beamforming based on JPTA frequency selective systems for smart repeaters in a wireless communication system similar as previously described.

Although FIG. 4 illustrates one example of a wireless network, various changes may be made to FIG. 4. For example, the wireless network could include any number of gNBs, any number of smart repeaters, and any number of UEs in any suitable arrangement. Also, the gNB 401 could communicate directly with any number of UEs and provide those UEs with wireless broadband access to the network 430. Similarly, gNB 102 could communicate directly with the network 430 and provide UEs with direct wireless broadband access to the network 430. Further, the gNBs 401, and 402, and/or 103 could provide access to other or additional external networks, such as external telephone networks or other types of data networks.

Figure 5:
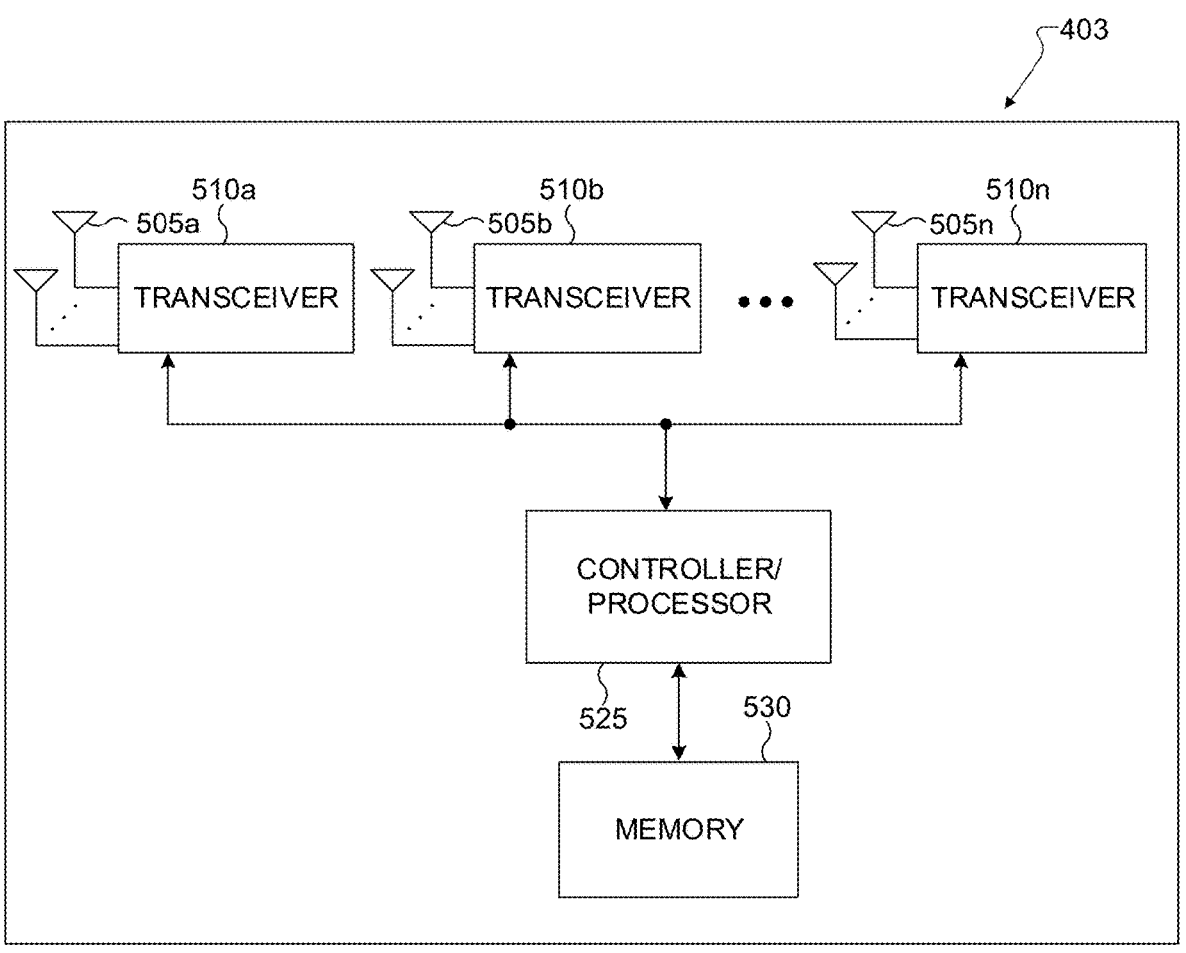
FIG. 5 illustrates an example smart repeater according to embodiments of the present disclosure.

FIG. 5 illustrates an example smart repeater 403 according to embodiments of the present disclosure. The embodiment of the smart repeater 403 illustrated in FIG. 5 is for illustration only, other smart repeaters could have the same or similar configuration. However, smart repeaters come in a wide variety of configurations, and FIG. 5 does not limit the scope of this disclosure to any particular implementation of a smart repeater.

As shown in FIG. 5, the smart repeater 403 includes multiple antennas 505a-505n, multiple transceivers 510a-510n, a controller/processor 525, and memory 530.

The transceivers 510a-510n receive, from the antennas 505a-505n, incoming RF signals, such as signals transmitted by gNB 402 and UEs in the network 400. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, and/or digitizing the baseband or IF signals. The controller/processor 225 may further process the baseband signals.

Transmit (TX) processing circuitry in the transceivers 510a-510n and/or controller/processor 525 receives analog or digital data (such as voice data, web data, e-mail, or interactive video game data) from the controller/processor 525. The TX processing circuitry multiplexes, and/or digitizes the outgoing baseband data to generate processed baseband or IF signals. The transceivers 510a-510n up-converts the baseband or IF signals to RF signals that are transmitted via the antennas 505a-505n.

The controller/processor 525 can include one or more processors or other processing devices that control the overall operation of the smart repeater 403. For example, the controller/processor 525 could control the reception of UL channel signals and the transmission of DL channel signals by the transceivers 510a-510n in accordance with well-known principles. The controller/processor 525 could support additional functions as well, such as more advanced wireless communication functions. For instance, the controller/processor 525 could support beam forming or directional routing operations in which outgoing/incoming signals from/to multiple antennas 505a-505n are weighted differently to effectively steer the outgoing signals in a desired direction. Any of a wide variety of other functions could be supported in the smart repeater 404 by the controller/processor 525.

The controller/processor 525 is also capable of executing programs and other processes resident in the memory 530, such as an OS and, for example, processes to support adaptive beamforming based on JPTA frequency selective systems for smart repeaters as discussed in greater detail below. The controller/processor 525 can move data into or out of the memory 530 as required by an executing process.

The memory 530 is coupled to the controller/processor 525. Part of the memory 530 could include a RAM, and another part of the memory 530 could include a Flash memory or other ROM.

Although FIG. 5 illustrates one example of smart repeater 403, various changes may be made to FIG. 5. For example, the smart repeater 403 could include any number of each component shown in FIG. 5. Also, various components in FIG. 5 could be combined, further subdivided, or omitted and additional components could be added according to particular needs.

In one embodiment, a smart repeater (such as smart repeater 403 of FIG. 4) comprises JPTA technology. JPTA assists the smart repeater in establishing frequency-dependent widebeams. These widebeams are directed to user equipments (UEs), hence serving UEs at different directions without inter-UE interference. These UEs will have a specific number of sub-carriers. The JPTA uses true-time delay (TTD) units that create these frequency-dependent variations. Unlike switches and phase-shifters, TTD elements can realize a frequency-dependent phase-shift that undergoes different transformations. Hence, the analog beam shape created by JPTA can vary with the frequency of the signal, outperforming frequency-flat analog beams.

In one embodiment, the smart repeater comprises JPTA technology that generates frequency-dependent beams by using true-time delay elements. In one embodiment, the smart repeater comprises transmit (TX) and receive (RX) JPTA arrays to enable frequency selective beamforming towards the UEs. In one embodiment, the smart repeater comprises phased arrays to beamform the signal towards a base station. In one embodiment, the smart repeater uses JPTA technology to beamform the signal towards a base station.

In one embodiment, the TX and RX JPTA arrays are assumed to be calibrated. In this embodiment, a UE sounds the channel on an uplink stream (e.g., using sounding reference signals (SRS)). By reciprocity, the downlink channel is the same.

In one embodiment, TX and RX JPTA arrays are not calibrated to each other. In this embodiment, a gNB sounds the downlink (DL) (e.g., using channel state information-reference signals (CSI-RS), and the UE sounds the uplink (UL).

Figure 6:
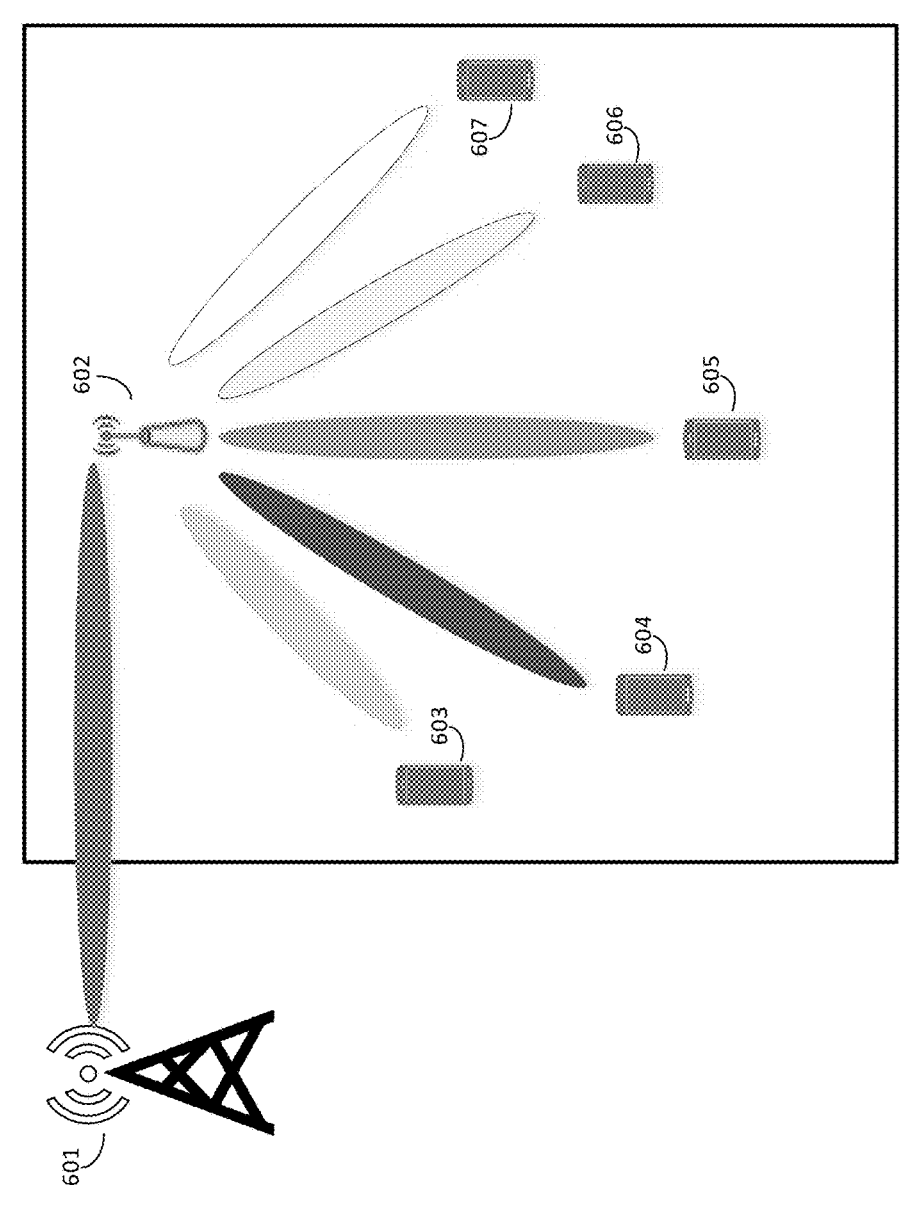
FIG. 6 illustrates an example of a smart repeater utilizing JPTA technology according to embodiments of the present disclosure.

FIG. 6 illustrates an example 600 of a smart repeater 602 utilizing JPTA technology according to embodiments of the present disclosure. The embodiment of smart repeater 602 of FIG. 6 is for illustration only. Different embodiments of smart repeater 602 could be used without departing from the scope of this disclosure.

In the example of FIG. 6, smart repeater 602 comprises TX and RX JPTA arrays which are assumed to be calibrated. Smart repeater 602 is located in a room (indoors) with UEs 603-607. A gNB 601 located outside of the room (outdoors) can assign different subcarriers to each of UEs 603-607 according to their channel conditions. For example, UEs 603-607 may sound respective channels, and as a result, gNB 601 may evaluate the channel conditions and begin allocating subcarriers to the intended UEs. Smart repeater 602 splits the beam over different frequencies in different directions i.e., frequency-dependent beamforming. Adaptive beamforming is achieved by the smart repeater as a result of the frequency-dependent beamforming capability provided by the JPTA to reach the intended UE.

Although FIG. 6 illustrates an example 600 of a smart repeater 602, various changes may be made to FIG. 6. For example, the number of UEs could change, the shape of the beams could change, etc. according to particular needs.

Figure 7:
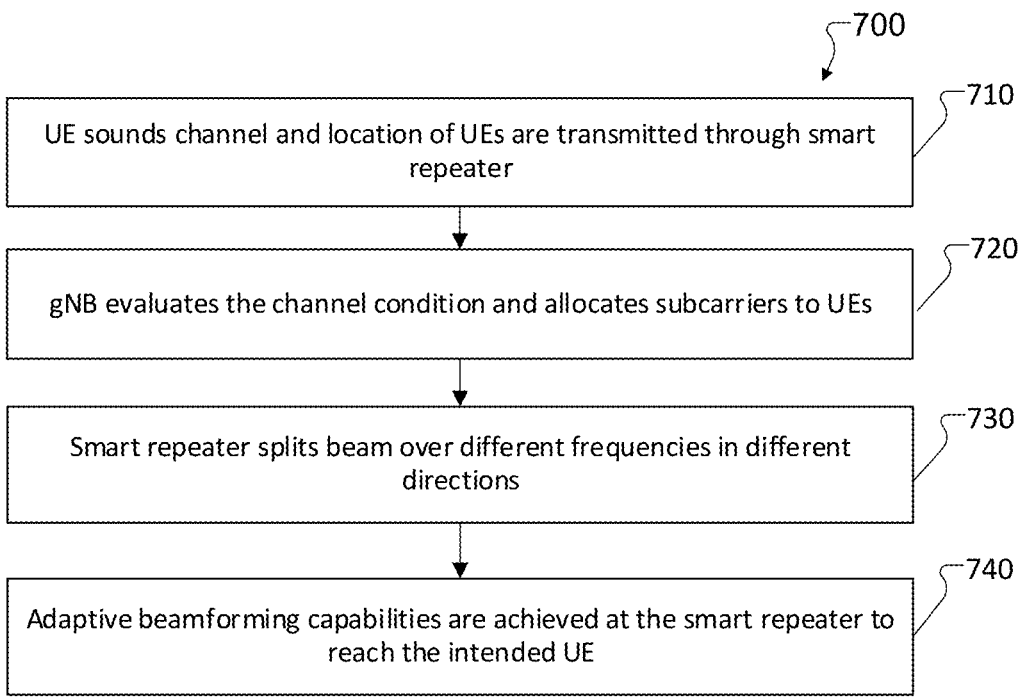
FIG. 7 illustrates a method for allocating subcarriers to UEs when TX and RX JPTA arrays of a smart repeater are presumed to be calibrated according to embodiments of the present disclosure.

FIG. 7 illustrates a method 700 for allocating subcarriers to UEs when TX and RX JPTA arrays of a smart repeater are presumed to be calibrated according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of allocating subcarriers could be used without departing from the scope of this disclosure.

As illustrated in FIG. 7, the method 700 begins at step 710. At step 710, a UE sounds the channel, and the location of the UEs are transmitted through a smart repeater. At step 720, a gNB evaluates the channel condition, and allocates subcarriers to the intended UEs. At step 730 the smart repeater splits the beam over different frequencies in different directions (i.e., frequency dependent beamforming). Finally, at step 740, adaptive beamforming capabilities are achieved at the smart repeater to reach the intended UE.

Although FIG. 7 illustrates one example of a method 700 for allocating subcarriers to UEs, various changes may be made to FIG. 7. For example, while shown as a series of steps, various steps in FIG. 7 could overlap, occur in parallel, occur in a different order, or occur any number of times.

FIG. 8 illustrates a method 800 for allocating subcarriers to UEs when TX and RX JPTA arrays of a smart repeater are not calibrated to each other according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of allocating subcarriers could be used without departing from the scope of this disclosure.

As illustrated in FIG. 8, the method 800 begins at step 810. At step 810, a gNB sounds the DL. At step 820, a UE sounds the UL, and the location of the UEs are transmitted through a smart repeater. At step 830, a gNB evaluates the channel condition, and allocates subcarriers to the intended UEs. At step 840 the smart repeater splits the beam over different frequencies in different directions (i.e., frequency dependent beamforming). Finally, at step 850, adaptive beamforming capabilities are achieved at the smart repeater to reach the intended UE.

Although FIG. 8 illustrates one example of a method 800 for allocating subcarriers to UEs, various changes may be made to FIG. 8. For example, while shown as a series of steps, various steps in FIG. 8 could overlap, occur in parallel, occur in a different order, or occur any number of times.

Smart repeater JPTA arrays may form frequency-selective beams that sway over a subsector (e.g., 45 degree of a 90 degree sector). These arrays may then steer the beam to cover the full sector on multiple time occasions. The smart repeater JPTA arrays may adapt the sway of the beam depending on the UE angular distribution/locations. For example, if the UEs are concentrated within a small angle/sector, the repeater may form a beam with narrow sway. In this case, larger BW can be assigned to each UE instead of having very narrow bandwidth. On the other hand, if the UEs are widely spread, the repeater may form a beam with large sway and narrow BW is assigned to each UE. This process can be done in multiple approaches. In one embodiment, the repeater can receive information from the network to adapt the beam sway. In one embodiment, the repeater can get location information from UEs, and then use this information to adapt the beam.

Figures 9A, 9B:
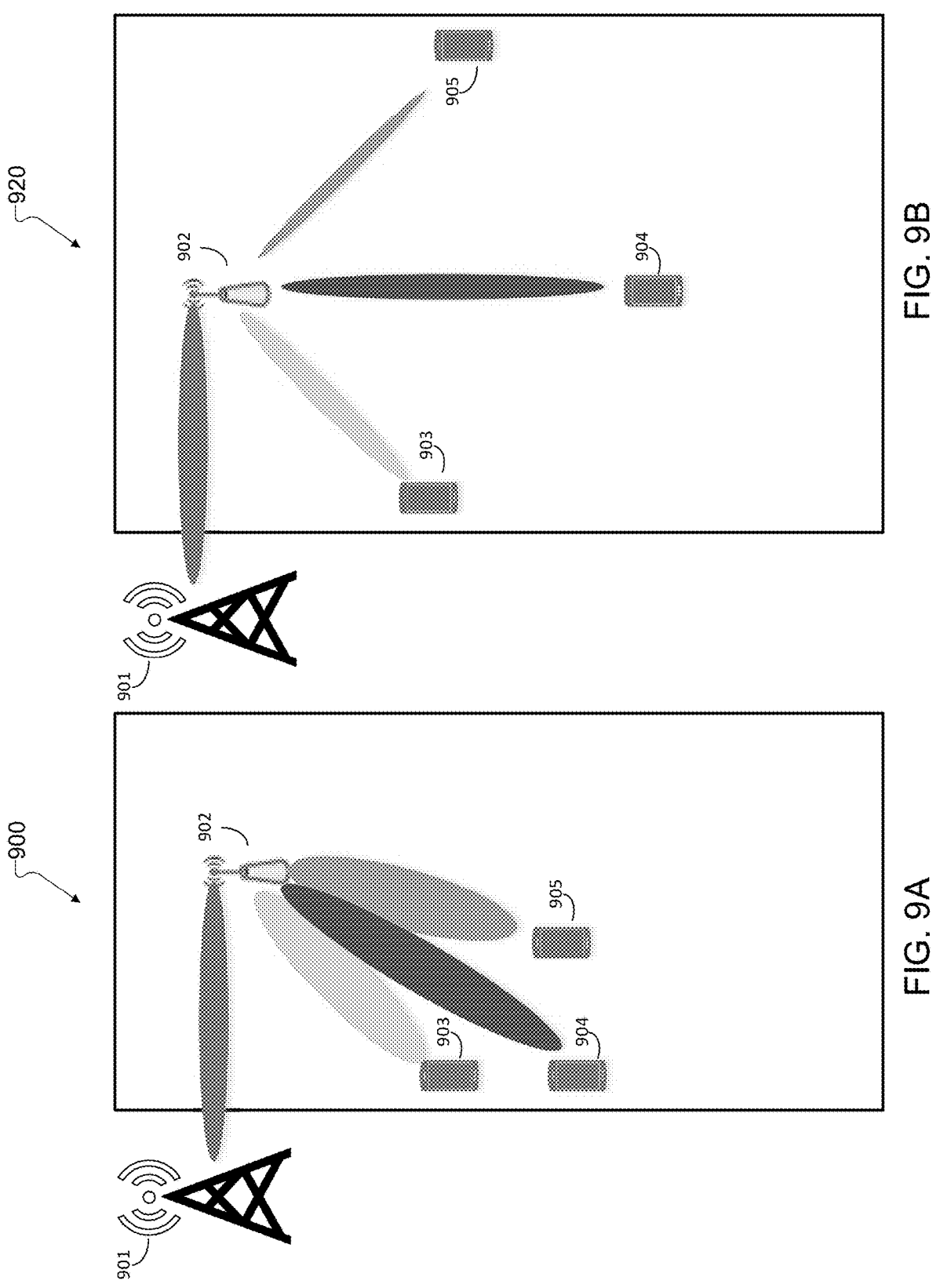
FIGS. 9A-9B illustrate examples of beam sway according to embodiments of the present disclosure.

FIGS. 9A-9B illustrate examples 900 and 920 of beam sway according to embodiments of the present disclosure. The embodiment of beam sway of FIGS. 9A-9B is for illustration only. Different embodiments of beam sway could be used without departing from the scope of this disclosure.

In the example of FIGS. 9A-9B, a smart repeater 902 receives information from a gNB 901 to adapt beam sway (e.g., beam sway adaption information).

FIG. 9A illustrates an example of a narrow beam sway where UEs 903, 904, and 905 are concentrated in a specific sector. In the example of FIG. 9A, a larger bandwidth is allocated to UEs 903-905 than in the example of FIG. 9B due to the narrower beam sway. This is represented by the beam of FIG. 9A transmitted from smart repeater 902 to UEs 903-905 being illustrated with a thicker appearance than in FIG. 9B.

FIG. 9B illustrates a larger beam sway where the UEs 903, 904, and 905 are not concentrated in a specific sector. In the example of FIG. 9B, a narrower bandwidth is allocated to UEs 903-905 than in the example of FIG. 9A due to the larger beam sway. This is represented by the beam of FIG. 9B transmitted from smart repeater 902 to UEs 903-905 being illustrated with a thinner appearance than in FIG. 9A.

Although FIGS. 9A-9B illustrate examples of 900 and 920 of beam sway, various changes may be made to FIGS. 9A-9B. For example, the number of UEs could change, the shape of the beams could change, etc. according to particular needs.

To reduce the overhead of constant channel sounding, a predictive engine may be used within a smart repeater to predict the areas where UEs are most likely to roam, and the number of subcarriers needed for each UE. For example, an artificial intelligence integrated into the smart repeater may collect information on the frequent locations of and the number of subcarriers typically allocated to particular UEs. This information may then be used by the gNB to predict how many subcarriers are needed to be allocated to each UE, reducing the channel sounding overhead.

In some environments, for instance indoor spaces with partition walls, multiple rooms within a building, etc. it may be difficult for a UE to achieve good line of sight with a smart repeater in certain locations within the environment. In these circumstances, it may be beneficial to employ multiple smart repeaters within the same environment. For example, as a UE roams through the environment, it may be able to have line of sight with a first repeater in some locations, and line of sight with a second repeater in other locations, improving the performance of the UE. In some instances, the UE may have good line of sight with multiple repeaters. Depending on the circumstances, the UE may communicate with a single repeater, or various techniques may be utilized to communicate with multiple repeaters to improve performance.

FIG. 10 illustrates an example 1000 of a multiple smart repeater deployment according to embodiments of the present disclosure. The example 1000 of FIG. 10 is for illustration only. Different embodiments of a multiple smart repeater deployment could be used without departing from the scope of this disclosure.

In the example of FIG. 10, smart repeaters 1002 and 1003 comprise TX and RX JPTA arrays. Smart repeater 1002 is located in far end of a building (indoors) behind two partition walls with UEs 1004, 1005, 1007, and 1008. Smart repeater 1032 is located in a near end of the building behind the two partition walls with UEs 1009, 1010, and 1011. UE 1006 is located between the partition walls and has clear line of sight to both smart repeater 1002 and 1003. A gNB 1001 located outside of the building (outdoors) can assign different subcarriers to each of UEs 1004-1011 according to their channel conditions. For example, UEs 1004-1011 may sound respective channels, and as a result, gNB 1001 may evaluate the channel conditions and begin allocating subcarriers to the intended UEs. Smart repeaters 1002 and 1003 split respective beams over different frequencies in different directions i.e., frequency-dependent beamforming. Adaptive beamforming is achieved by the smart repeaters as a result of the frequency-dependent beamforming capability provided by the JPTA to reach the intended UE.

Although FIG. 10 illustrates an example 1000 of a multiple smart repeater deployment, various changes may be made to FIG. 10. For example, the number of UEs could change, the number of smart repeaters could change, the number of gNBs could change, the shape of the beams could change, etc. according to particular needs.

To optimize repeater deployments, a predictive engine may be used within a smart repeater to identify ideal placement of the smart repeater, identify areas with poor coverage that may benefit from additional smart repeaters, identify areas with redundant coverage where placement of multiple smart repeaters could be better optimized, etc. For example, an artificial intelligence integrated into the smart repeater may collect information related to UE performance, etc. to identify areas of poor coverage or redundant coverage, and report suggested improvements such as relocation of one or more smart repeaters in the environment, addition or removal of smart repeaters from the environment, etc.

Figure 11:
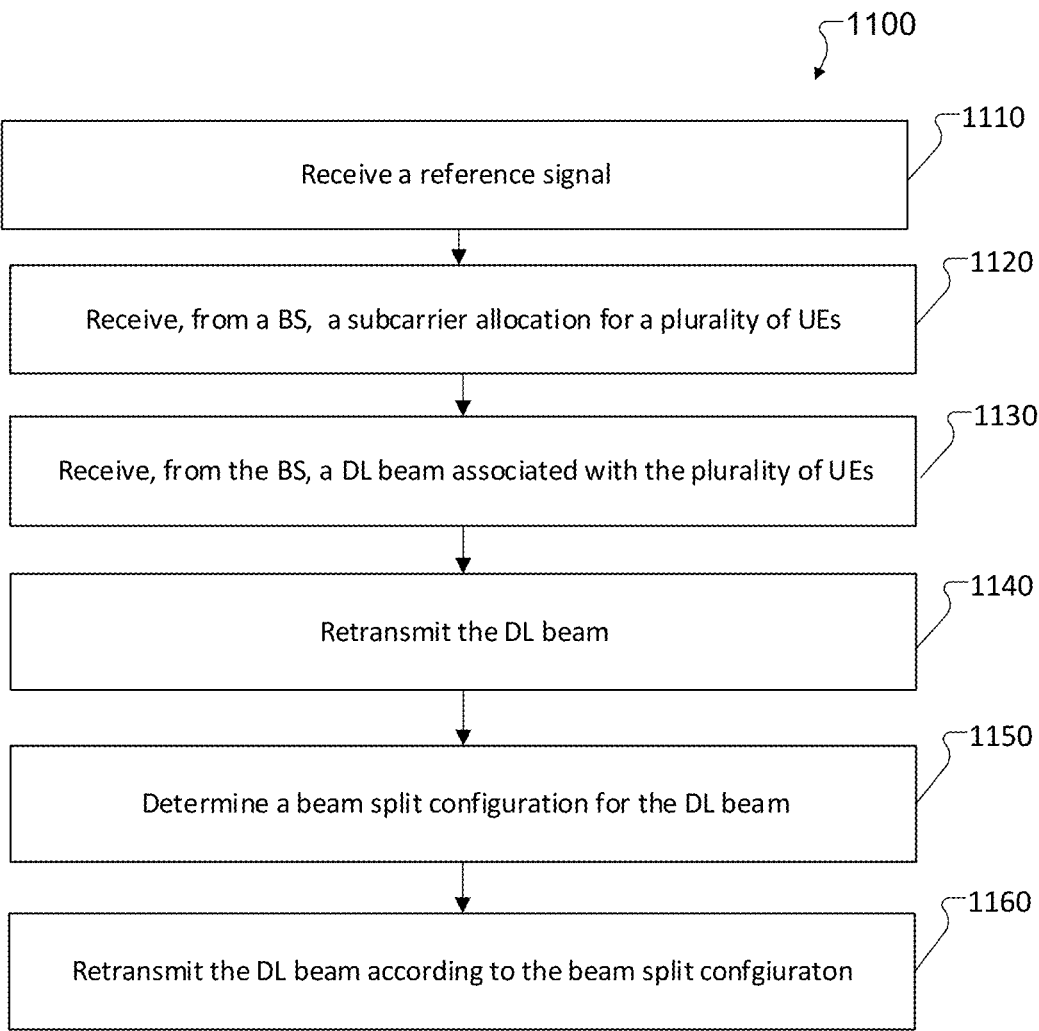
FIG. 11 illustrates an example method for adaptive beamforming based on joint phase-time array frequency selective systems for smart repeaters according to embodiments of the present disclosure.

FIG. 11 illustrates a method 1100 for adaptive beamforming based on joint phase-time array frequency selective systems for smart repeaters according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments of adaptive beamforming could be used without departing from the scope of this disclosure.

As illustrated in FIG. 11, the method 1100 begins at step 1110. At step 1110, A smart repeater receives a reference signal. At step 1120, the smart repeater receives, from a BS, a subcarrier allocation for a plurality of UEs. At step 1130, the smart repeater receives, from the BS, a DL beam associated with the plurality of UEs. At step 1140, the smart repeater retransmits the DL beam. At step 1150, the smart repeater determines a beam split configuration for the DL beam. The beam split configuration may be based on the subcarrier allocation. Finally, at step 1160, the smart repeater retransmits the DL beam according to the beam split configuration. Retransmitting the DL beam according to the beam split configuration may include generating a frequency dependent beam for each of the plurality of UEs, and directing the frequency dependent beam for each of the plurality of UEs to a UE associated with the frequency dependent beam.

Although FIG. 11 illustrates one example of a method 1100 for adaptive beamforming based on joint phase-time array frequency selective systems for smart repeaters, various changes may be made to FIG. 11. For example, while shown as a series of steps, various steps in FIG. 11 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A smart repeater comprising:
a transceiver configured to:
  receive a reference signal;
  receive, from a base station (BS), a subcarrier allocation for a plurality of user equipments (UEs); and
  receive, from the BS, a downlink (DL) beam associated with the plurality of UEs; and
a processor, operatively coupled to the transceiver, the processor configured to:
  determine a beam split configuration for the DL beam based on the subcarrier allocation; and
  cause the transceiver to retransmit the DL beam according to the beam split configuration,
wherein to retransmit the DL beam according to the beam split configuration the transceiver is further configured to:
generate a frequency dependent beam for each of the plurality of UEs; and
direct the frequency dependent beam for each of the plurality of UEs to a UE associated with the frequency dependent beam.

2. The smart repeater of claim 1, wherein:
the transceiver comprises a receive (RX) joint phase-time array (JPTA) and a transmit (TX) JPTA;
the transceiver is further configured to receive a plurality of uplink (UL) beams from the plurality of UEs; and
the processor is further configured to:
  determine a UL beam retransmission configuration; and
  cause the transceiver to retransmit the UL beams based on the UL beam retransmission configuration,
wherein to retransmit the UL beams based on the UL beam retransmission configuration, the transceiver is further configured to:
  generate a retransmission UL beam based on the plurality of UL beams; and
  direct the retransmission UL beam to the BS.

3. The smart repeater of claim 1, wherein:
the reference signal is at least one sounding reference signal transmitted by at least one UE from the plurality of UEs; and the processor is further configured:
  determine a respective location for each of the plurality of UEs; and
  cause the transceiver to transmit, to the BS, the respective location for each of the plurality of UEs,
wherein the subcarrier allocation and the directing of the frequency dependent beam for each of the plurality of UEs is based on the respective location for each of the plurality of UEs.

4. The smart repeater of claim 1, wherein:
the reference signal is a channel state information reference signal (CSI-RS) transmitted by the BS;
the transceiver is further configured to retransmit, to the plurality of UEs, the CSI-RS; and
to retransmit, to the BS, a response based on the CSI-RS from the plurality of UEs,
wherein the subcarrier allocation is based on the response based on the CSI-RS.

5. The smart repeater of claim 1, wherein the processor is further configured to:
receive, from a network entity, beam sway adaptation information; and
cause the transceiver to adapt a beam sway of the retransmitted DL beam based on the beam sway adaptation information.

6. The smart repeater of claim 1, the processor is further configured to:
determine a respective location for each of the plurality of UEs; and
cause the transceiver to adapt a beam sway of the retransmitted DL beam based on the respective location for each of the plurality of UEs.

7. The smart repeater of claim 1, wherein the transceiver is configured to transmit and receive using millimeter wave (mmWave) frequencies, and the transceiver comprises a receive (RX) joint phase-time array (JPTA) and a transmit (TX) JPTA.

8. A method for operating a smart repeater, the method comprising:
receiving a reference signal;
receiving, from a base station (BS), a subcarrier allocation for a plurality of user equipments (UEs);
receiving, from the BS, a downlink (DL) beam associated with the plurality of UEs;
determining a beam split configuration for the DL beam based on the subcarrier allocation; and
retransmitting the DL beam according to the beam split configuration,
wherein retransmitting the DL beam according to the beam split configuration comprises:
  generating a frequency dependent beam for each of the plurality of UEs; and
  directing the frequency dependent beam for each of the plurality of UEs to a UE associated with the frequency dependent beam.

9. The method of claim 8, further comprising:
receiving a plurality of uplink (UL) beams from the plurality of UEs;
determining a UL beam retransmission configuration; and
retransmitting the UL beams based on the UL beam retransmission configuration,
wherein retransmitting the UL beams based on the UL beam retransmission configuration comprises:
  generating a retransmission UL beam based on the plurality of UL beams; and
  directing the retransmission UL beam to the BS, and
wherein the smart repeater comprises a receive (RX) joint phase-time array (JPTA) and a transmit (TX) JPTA.

10. The method of claim 8, wherein the reference signal is at least one sounding reference signal transmitted by at least one UE from the plurality of UEs, and the method further comprises:

determining a respective location for each of the plurality of UEs; and transmitting, to the BS, the respective location for each of the plurality of UEs, wherein the subcarrier allocation and the directing of the frequency dependent beam for each of the plurality of UEs is based on the respective location for each of the plurality of UEs.

11. The method of claim 8, wherein the reference signal is a channel state information reference signal (CSI-RS) transmitted by the BS, and the method further comprises:

retransmitting, to the plurality of UEs, the CSI-RS; and retransmitting, to the BS, a response based on the CSI-RS from the plurality of UEs, wherein the subcarrier allocation is based on the response based on the CSI-RS.

12. The method of claim 8, further comprising:

receiving, from a network entity, beam sway adaptation information; and adapting a beam sway of the retransmitted DL beam based on the beam sway adaptation information.

13. The method of claim 8, further comprising:

determining a respective location for each of the plurality of UEs; and adapting a beam sway of the retransmitted DL beam based on the respective location for each of the plurality of UEs.

14. The method of claim 8, wherein the smart repeater is configured to transmit and receive using millimeter wave (mmWave) frequencies, and the smart repeater comprises a receive (RX) joint phase-time array (JPTA) and a transmit (TX) JPTA.

15. A non-transitory computer readable medium embodying a computer program, the computer program comprising program code that, when executed by a processor of a device, causes the device to:

receive a reference signal;

receive, from a base station (BS), a subcarrier allocation for a plurality of user equipments (UEs);

receive, from the BS, a downlink (DL) beam associated with the plurality of UEs;

determine a beam split configuration for the DL beam based on the subcarrier allocation; and retransmit the DL beam according to the beam split configuration, wherein to retransmit the DL beam according to the beam split configuration the computer program further comprises program code that, when executed by the processor of the device, causes the device to:

generate a frequency dependent beam for each of the plurality of UEs; and direct the frequency dependent beam for each of the plurality of UEs to a UE associated with the frequency dependent beam.

16. The non-transitory computer readable medium of claim 15, wherein the computer program further comprises program code that, when executed by the processor of the device causes the device to:

receive a plurality of uplink (UL) beams from the plurality of UEs;

determine a UL beam retransmission configuration; and retransmit the UL beams based on the UL beam retransmission configuration, wherein to retransmit the UL beams based on the UL beam retransmission configuration the computer program further comprises program code that, when executed by the processor of the device causes the device to:

generate a retransmission UL beam based on the plurality of UL beams; and direct the retransmission UL beam to the BS.

17. The non-transitory computer readable medium of claim 15, wherein the reference signal is at least one sounding reference signal transmitted by at least one UE from the plurality of UEs, and wherein the computer program further comprises program code that, when executed by the processor of the device causes the device to:

determine a respective location for each of the plurality of UEs; and transmit, to the BS, the respective location for each of the plurality of UEs, wherein the subcarrier allocation and the directing of the frequency dependent beam for each of the plurality of UEs is based on the respective location for each of the plurality of UEs.

18. The non-transitory computer readable medium of claim 15, wherein the reference signal is a channel state information reference signal (CSI-RS) transmitted by the BS, and wherein the computer program further comprises program code that, when executed by the processor of the device causes the device to:

retransmit, to the plurality of UEs, the CSI-RS; and retransmit, to the BS, a response based on the CSI-RS from the plurality of UEs, wherein the subcarrier allocation is based on the response based on the CSI-RS.

19. The non-transitory computer readable medium of claim 15, wherein the computer program further comprises program code that, when executed by the processor of the device causes the device to:

receive, from a network entity, beam sway adaptation information; and adapt a beam sway of the retransmitted DL beam based on the beam sway adaptation information.

20. The non-transitory computer readable medium of claim 15, wherein the computer program further comprises program code that, when executed by the processor of the device causes the device to:

determine a respective location for each of the plurality of UEs; and adapt a beam sway of the retransmitted DL beam based on the respective location for each of the plurality of UEs.

* * * * *